(12) United States Patent
Lim et al.

(10) Patent No.: US 10,895,362 B2
(45) Date of Patent: Jan. 19, 2021

(54) LIGHTING DEVICE HAVING A PLURALITY OF LIGHT SOURCES AND A LIGHT GUIDE

(71) Applicant: LG INNOTEK CO., LTD., Seoul (KR)

(72) Inventors: Eay Jin Lim, Seoul (KR); Seung Jong Baek, Seoul (KR); Kyu Sung Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/646,198

(22) PCT Filed: Sep. 13, 2018

(86) PCT No.: PCT/KR2018/010736
§ 371 (c)(1),
(2) Date: Mar. 11, 2020

(87) PCT Pub. No.: WO2019/059578
PCT Pub. Date: Mar. 28, 2019

(65) Prior Publication Data
US 2020/0271294 A1    Aug. 27, 2020

(30) Foreign Application Priority Data
Sep. 20, 2017    (KR) .................... 10-2017-0121070

(51) Int. Cl.
*F21S 43/239*    (2018.01)
*F21S 43/249*    (2018.01)

(52) U.S. Cl.
CPC ........... *F21S 43/239* (2018.01); *F21S 43/249* (2018.01); *F21V 2200/00* (2015.01)

(58) Field of Classification Search
CPC .............................. F21S 43/239; F21S 43/249
See application file for complete search history.

(56) References Cited

U.S. PATENT DOCUMENTS

| 2002/0061178 A1 | 5/2002 | Winston et al. |
| 2010/0315817 A1 | 12/2010 | Zimmermann |

(Continued)

FOREIGN PATENT DOCUMENTS

| DE | 10 2011 10710 | 1/2012 |
| JP | 2012-104476 | 5/2012 |

(Continued)

OTHER PUBLICATIONS

International Search Report dated Dec. 12, 2018 issued in Application No. PCT/KR2018/010736.

(Continued)

*Primary Examiner* — Joseph L Williams
(74) *Attorney, Agent, or Firm* — Ked & Associates LLP

(57) ABSTRACT

A lighting device may include a plurality of light sources which are disposed on the circumference of a concentric circle, a light guide which surrounds the light sources and is disposed adjacent to the light sources, and a cover member which surrounds the upper surfaces of the light sources and the upper and side surfaces of the light guide. The light guide has a first surface in the light source direction and a second surface in a direction opposite to the light source which have an inclination with respect to the optical axis of the light emitted from the light sources. The cover member has a light transmitting pattern in a light diffusion region facing the upper surface of the light guide.

20 Claims, 7 Drawing Sheets

(56) References Cited

U.S. PATENT DOCUMENTS

2012/0014128 A1   1/2012  Lin
2013/0021823 A1   1/2013  Yamagami
2017/0176664 A1   6/2017  Yang et al.

FOREIGN PATENT DOCUMENTS

| KR | 10-0573634      | 4/2006  |
| KR | 10-0651551      | 11/2006 |
| KR | 10-2013-0006497 | 1/2013  |
| KR | 10-1417562      | 7/2014  |
| KR | 10-2015-0092652 | 8/2015  |
| KR | 10-2015-0108213 | 9/2015  |

OTHER PUBLICATIONS

European Search Report dated Oct. 15, 2020 issued in EP Application No. 18858494.0.

LIGHTING DEVICE HAVING A PLURALITY OF LIGHT SOURCES AND A LIGHT GUIDE

CROSS-REFERENCE TO RELATED PATENT APPLICATIONS

This application is a U.S. National Stage Application under 35 U.S.C. § 371 of PCT Application No. PCT/KR2018/010736, filed Sep. 13, 2018, which claims priority to Korean Patent Application No. 10-2017-0121070, filed Sep. 20, 2017, whose entire disclosures are hereby incorporated by reference.

TECHNICAL FIELD

Embodiments relate to a lighting device, and more particularly to a lighting device provided at an outside of a vehicle.

BACKGROUND ART

Light emitting devices, such as light emitting diodes or laser diodes, which use a Group III-V or II-VI compound semiconductor material, may render various colors such as red, green, blue and ultraviolet by virtue of development of thin film growth technologies and device materials. Such light emitting devices may also realize white light at high efficiency using fluorescent materials or through color mixing, and have advantages of low power consumption, semi-permanent lifespan, fast response time, safety and environmental friendliness, as compared to conventional light sources such as fluorescent lamps and incandescent lamps.

In this regard, these light emitting devices are increasingly applied to transmission modules of optical communication units, light emitting diode backlights as a replacement for cold cathode fluorescent lamps (CCFLs) constituting backlights of liquid crystal display (LCD) devices, lighting devices using white light emitting diodes as a replacement for fluorescent lamps or incandescent lamps, headlights for vehicles, and traffic lights.

When such a light emitting device is used as an external lighting device of a vehicle or the like, the light emitting device externally emits light generated from a light emitting diode using a light guide plate.

Although the light guide plate is advantageous in association with realization of a surface light source, the light guide plate may have difficulty realizing an outer shape formed with a curvature because the material thereof is not soft. Furthermore, realization of a light image with a desired shape or color may be difficult. For this reason, design of a desired product and design modification may be difficult.

DISCLOSURE

Technical Problem

Embodiments are adapted to diversify a light image externally displayed by a lighting device for a vehicle or the like.

In addition, embodiments are adapted to provide a lighting device capable of increasing an amount of light advancing toward a front side when used in a vehicle or the like.

Technical Solution

In one embodiment, there is provided a lighting device including: a plurality of light sources disposed at a circumference of a concentric circle; a light guide disposed adjacent to the light sources while surrounding the light sources; and a cover member configured to surround upper surfaces of the light sources and upper and side surfaces of the light guide, wherein the light guide is configured such that a first surface thereof in a direction of the light sources and a second surface thereof in a direction opposite to the light sources have inclinations with respect to an optical axis of light emitted from the light sources, respectively, and the cover member has a light-transmissive pattern in a light diffusion area thereof facing the upper surface of the light guide.

Light exit surfaces of the plural light sources may be disposed in a direction opposite to a center of the concentric circle.

Optical axes of light beams respectively emitted from the plural light sources may be arranged to extend from a center of the concentric circle.

Angles formed by the optical axes of the light beams emitted from adjacent ones of the light sources may be equal.

The light guide may be provided with a plurality of grooves at a central first area thereof such that the plural light sources are inserted into the grooves, respectively.

Each of the grooves may have a horizontal cross-section having at least four sides Each of the grooves may include a first surface in a light exit surface direction of the corresponding light source, a second surface facing the first surface, and third and fourth surfaces between the first surface and the second surface.

An inclination of a light incidence surface of the light guide with respect to the optical axis of light emitted from the light sources may be equal to an inclination of a light exit surface of the light guide with respect to the optical axis of light emitted from the light sources.

A first angle, at which a light incidence surface of the light guide is inclined with respect to the optical axis of light emitted from the light sources, may be 40 to 50°.

A second angle, at which a light exit surface of the light guide is inclined with respect to the optical axis of light emitted from the light sources, is 130 to 140°.

The light-transmissive pattern of the cover member may be disposed over optical axes of light beams emitted from the plural light sources.

The cover member may further include light shields respectively disposed in an inner area inside the light-transmissive pattern and an outer area outside the light-transmissive pattern.

The inner area may have a greater thickness than the light diffusion area.

The light guide may be provided with a first pattern at a lower surface thereof.

The light guide and the cover member may be spaced apart from each other. An air guide may be formed in a space area between the light guide and the cover member.

In another embodiment, there is provided a lighting device including: a plurality of light sources disposed at a circumference of a concentric circle; a light guide disposed adjacent to the light sources while surrounding the light sources; and a cover member configured to surround upper surfaces of the light sources and upper and side surfaces of the light guide, wherein the cover member has an inner surface facing the light guide while having an inclination with respect to optical axes of light beams emitted from the light sources.

Advantageous Effects

In the lighting device according to each embodiment, light concentration effects may be enhanced in accordance with the configuration in which the light incidence surface and light exit surface of the light guide are inclined. Accordingly, the amount of light advancing toward a front surface increases, as compared to conventional lighting devices.

Furthermore, a new image may be realized in accordance with the inclination configuration of the light incidence surface and light exit surface of the light guide and the light-transmissive patterns.

When the inner surface of the cover member is inclined, light passing through the light guide is reflected from the inner surface of the cover member and, as such, illumination at the edge area of the lighting device may increase.

BEST MODE

Figure 1:
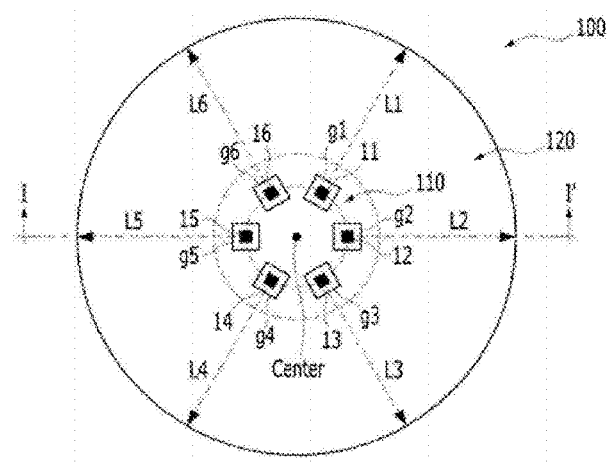
FIG. 1 is a view showing upper surfaces of light sources and a light guide in a lighting device according to an embodiment.

Hereinafter, embodiments capable of concretely accomplishing the above-described object will be described with reference to the accompanying drawings.

In the following description of embodiments, it will be understood that, when an element is referred to as being "on" or "under" another element, it can be directly on or under the other element or can be indirectly formed such that an intervening element is also present. Furthermore, when the expression "on" or "under" is used herein, it may involve not only the upward direction, but also the downward direction, with reference to one element.

In addition, it will be understood that relative terms used hereinafter such as "first", "second", "on"/"above"/"over" and "under"/"below"/"beneath" may be construed only to distinguish one element from another element without necessarily requiring or involving a certain physical or logical relation or sequence between the elements. In addition, the same reference numerals throughout illustration of the drawings designate the same elements.

The terms "including", "comprising", "having" and variations thereof disclosed herein mean "including but not limited to" unless expressly specified otherwise, and, as such, should not be construed to exclude elements other than the elements disclosed herein and should be construed to further include additional elements. In addition, the terms "corresponding" and variations thereof disclosed herein may encompass at least one of meanings of "facing" and "overlapping".

Figure 2:
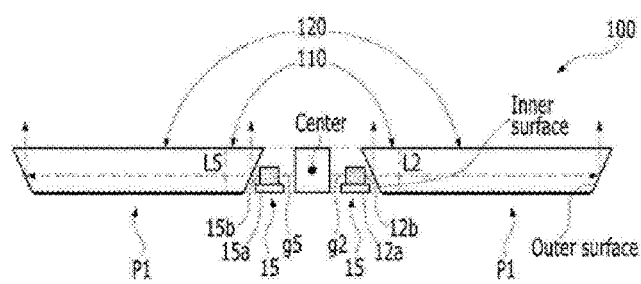
FIG. 2 is a cross-sectional view taken along line I-I' in FIG. 1.

FIG. 1 is a view showing upper surfaces of light sources and a light guide in a lighting device according to an embodiment. FIG. 2 is a cross-sectional view taken along line I-I' in FIG. 1.

The lighting device according to the embodiment may include light sources 11 to 16, a light guide 100, and a cover member 200.

The light sources 11 to 16 may surround the center of a concentric circle, and may be disposed on a circumference of the concentric circle indicated by a dotted line in FIG. 1. Although 6 light sources 11 to 16 are shown, embodiments are not limited thereto.

Although the light sources 11 to 16 may be distinguished from one another as first to sixth light sources 11 to 16, respectively, for convenience of description, the light sources 11 to 16 may have the same shape.

In FIG. 2, the second light source 12 is shown. The second light source 12 may include a circuit board 12a, and a light emitting element 12b disposed on the circuit board 12a.

The circuit board 12a may be a printed circuit board or a flexible printed circuit board, without being limited thereto.

The light emitting element 12b may be a light emitting diode, without being limited thereto. The light emitting diode is a p-n junction diode configured to emit light through recombination of surplus electrons and holes. The p-n junction diode utilizes a principle in which, when a voltage is forwardly applied through a p-n junction of a semiconductor, electrons in an n-region meet holes in a p-region, thereby undergoing recombination and emitting light.

The light emitting elements 12b may be driven in an independent manner or may be operatively connected to be driven by the same signal. The image of FIG. 9, which will be described later, represents an external image of the lighting device shown when 6 light emitting elements in the lighting device simultaneously emit light.

The light guide 100 may be disposed to surround the light sources 11 to 16. The light guide 100 may be disposed adjacent to the light sources 11 to 16. In detail, the light guide 100 includes a first area 110, which is centrally disposed, and a second area 120 disposed around the first area 110. The first area 110 and the second area 120 may be made of the same material while being integrated with each other without being physically distinguished from each other. In addition, the first area 110 and the second area 120 may have the same thickness.

The light guide 100 may be, for example, a light guide plate, without being limited thereto. The light guide plate may be a transparent acryl panel made of a polymethyl methacrylate (PMMA) resin.

The first area 110 of the light guide 100 may surround the light sources 11 to 16 while forming a circumference surrounding the center of the concentric circle at an edge thereof. The second area 120 is disposed around the first area 110 while forming a circumference surrounding the center of the concentric circle at an edge thereof.

A plurality of grooves g1 to g6 may be provided in the first area 110 of the light guide 100. For convenience of description, the grooves g1 to g6 may be referred to as "first to sixth grooves g1 to g6". The light sources 11 to 16 may be disposed one by one at the grooves g1 to g6 in an inserted manner, respectively. The number of the grooves g1 to g6 may be equal to the number of the light sources 11 to 16.

Referring to FIG. 2, each of the grooves g1 to g6 may be formed to be open at a lower portion thereof in the first area 110. The light sources 11 to 16 may be disposed at the opened lower portions of the grooves g1 to g6 in an inserted manner, respectively. In addition, respective upper portions of the grooves g1 to g6 may be open, but may be blocked by the material forming the light guide 100.

Respective side surfaces of the grooves g1 to g6 may be surrounded by the material forming the light guide 100. This will be described later with reference to FIG. 6.

In FIG. 2, a side surface of the light guide 100 in a light source direction may be referred to as a "first surface (inner surface)", and a side surface of the light guide 100 in a direction opposite to the first surface (inner surface) may be referred to as a "second surface (outer surface)". In this case, each of the first surface (inner surface) and the second surface (outer surface) may have an inclination with respect to an optical axis of light emitted from the light sources 11 to 16. Here, the inclination means that, as shown in FIG. 2, the first surface (inner surface) and the second surface (outer surface) are inclined with respect to a direction perpendicular to a horizontal advance direction of light L2 indicated by a dotted line in FIG. 2, without being perpendicular to the horizontal advance direction.

Figure 3:
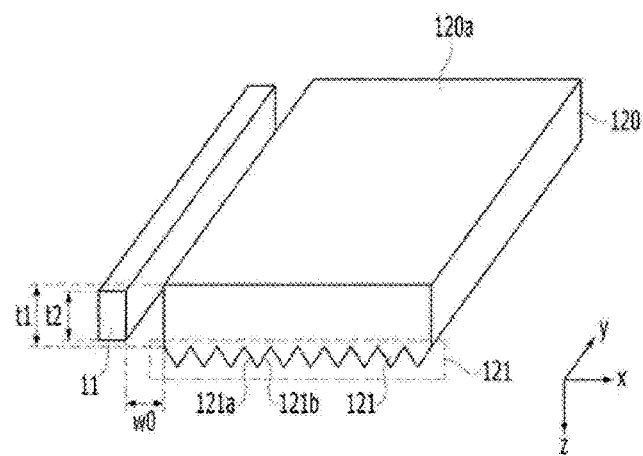
FIG. 3 is a view concretely showing one light source and a second area of the light guide shown in FIG. 1.
Figure 4:
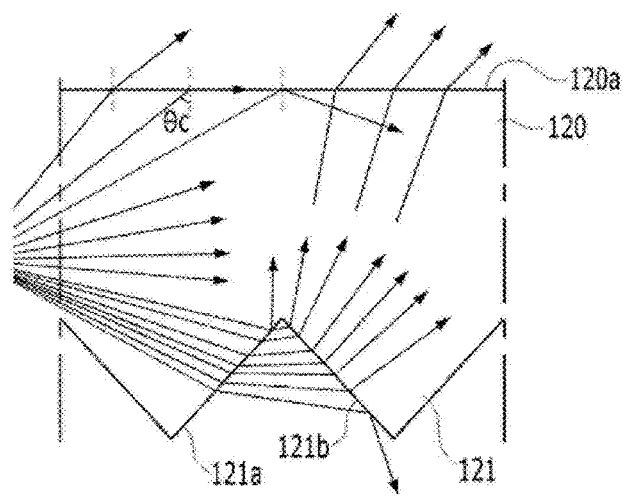
FIG. 4 is an enlarged sectional view corresponding to a portion of FIG. 3.
Figure 5:
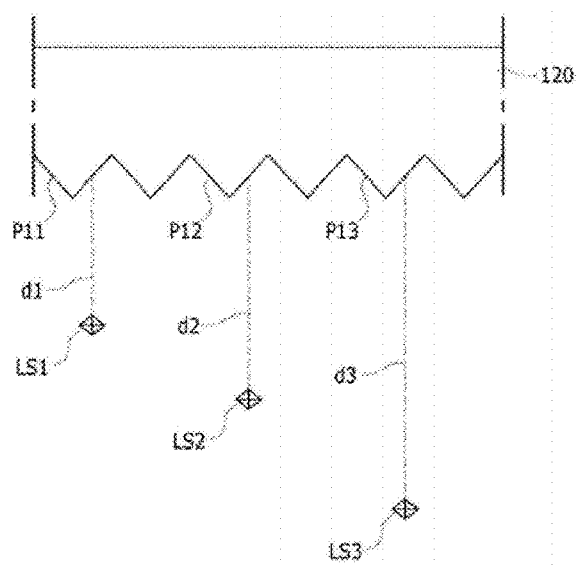
FIG. 5 is an enlarged view corresponding to another portion of FIG. 3.

FIG. 3 is a view concretely showing one light source and the second area of the light guide shown in FIG. 1. FIG. 4 is an enlarged sectional view corresponding to a portion of FIG. 3. FIG. 5 is an enlarged view corresponding to another portion of FIG. 3.

Hereinafter, a first pattern at a lower surface of the light guide in the lighting device according to the embodiment will be described in detail with reference to FIGS. 3 to 5.

FIG. 3 shows the second area 120 disposed adjacent to the first light source 11 of the light guide, and a three-dimensional effect formation section 121. The second area 120 of the light guide, which has the above-described first pattern P1 at the lower surface thereof, will be illustrated in FIG. 3 and described.

The second area 120 of the light guide may have a thickness t1 of not less than about 0.1 mm, but not more than about 10.0 mm. When the thickness t1 of the second area 120 in the light guide is less than 0.1 mm, manufacturing costs may increase because the first light source 11 should be manufactured such that a height t2 thereof is reduced. On the other hand, when the thickness t1 of the second area 120 is more than 1.0 cm, the thickness and weight of the lighting device may increase, and manufacturing costs of the lighting device may increase.

The three-dimensional effect formation section 121 may include a plurality of patterns 121 provided through partial removal of one surface of the second area 120. The plural patterns 121 may include concave portions or convex portions sequentially arranged at a first surface of the second area 120 of the light guide in a predetermined direction (x-direction) while having inclined surfaces 121a and 121b inclined with respect to the first surface or a second surface 120a opposite to the first surface.

The plural patterns 121 may be a portion of the first pattern P1 as described above. The first light source 11 and the second area 120a of the light guide may be disposed to be spaced apart from each other by a predetermined space w0. The space w0 may be filled with air or a transparent material such as resin or the like.

The first light source 11 may have a light exit surface disposed to face a side surface of the second area 120 of the light guide. The light exit surface may have a circular shape, an oval shape, a triangular shape, a quadrangular shape, or a polygonal shape having sides not less than those of a pentagonal shape.

The height t2 of the first light source 11 in a thickness direction of the second area 120 of the light guide may be less than the thickness t1 of the second area 120 of the light guide. This is because light exiting the light exit surface of the first light source 11 advances while being diffused in upward and downward directions of FIG. 3 and, as such, may be incident upon a side surface of the second area 120 of the light guide.

Light advancing within the second area 120 of the light guide may be transmitted within the second area 120 of the light guide through reflection and refraction at the inclined surfaces 121a and 121b of the plural patterns of the three-dimensional effect formation section 121.

Referring to FIG. 4, light meeting the inclined surfaces 121a and 121b of each pattern of the three-dimensional effect formation section 121 may be refracted or reflected in accordance with an incidence angle thereof. In this case, when the incidence angle is less than a critical angle $\theta c$, light passing the light guide 10a may advance in such a manner that the light passes through each pattern while being refracted in accordance with a refractive index difference. When the incidence angle is not less than the critical angle $\theta c$, the light may be reflected from the inclined surfaces 121a and 121b of each pattern.

The inclined surfaces 121a and 121b of each pattern may have predetermined surface roughness, for appropriate refraction and reflection of incident light passing the second area 120 of the light guide.

It may be possible to realize linear light or three-dimensional effect light advancing in a specific path by adjusting refraction and reflection performance of the inclined surfaces 121a and 121b of the plural patterns through design of the patterns of the three-dimensional effect formation section 121 as described above.

FIG. 5 concretely shows first to third patterns P1 to P3 among the plural patterns of the three-dimensional effect formation section 121. Here, the first to third patterns P1, P2 and P3 may be arranged to be gradually more distant from the light source in this order while being continuously disposed. Of course, another pattern may be disposed between two adjacent patterns.

The plural patterns constituting the three-dimensional effect formation section serve as indirect light sources through refraction and reflection at each inclined surface thereof in accordance with an increase in distances d1, d2 and d3 thereof from the first light source (not shown) when viewed at an outside of the second area 120 of the light guide. In this case, specific portions of light paths of the plural patterns may serve as indirect light sources, respectively. These indirect light sources may be referred to as "dummy light sources LS1, LS2 and LS3", respectively.

In the lighting device according to the present embodiment, the plural patterns provided, in particular, at the lower surface of the second area 120 of the light guide may serve as indirect light sources exhibiting brightness gradually reduced as light paths are gradually more distant from the light source by the inclined surfaces of the plural patterns. Accordingly, the lighting device may produce three-dimensional effect beams having a distance effect and a depth effect in a thickness direction of the light guide.

Figure 6:
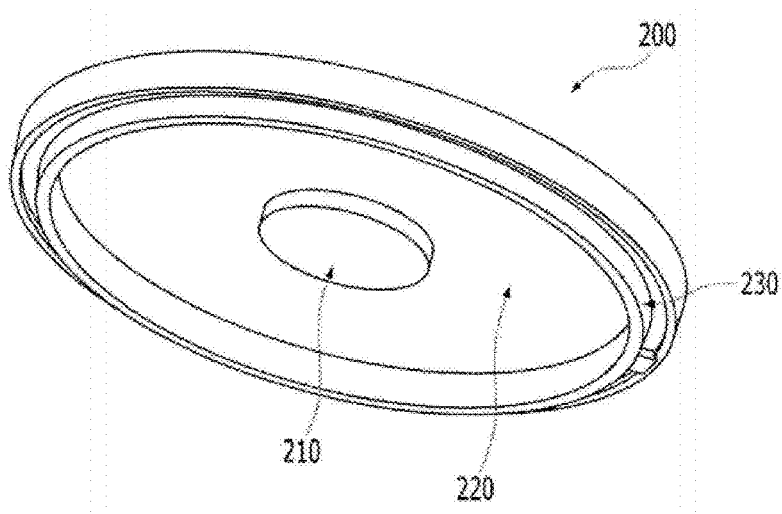
FIG. 6 is a perspective view of a cover member in the lighting device according to the embodiment.
Figure 7:
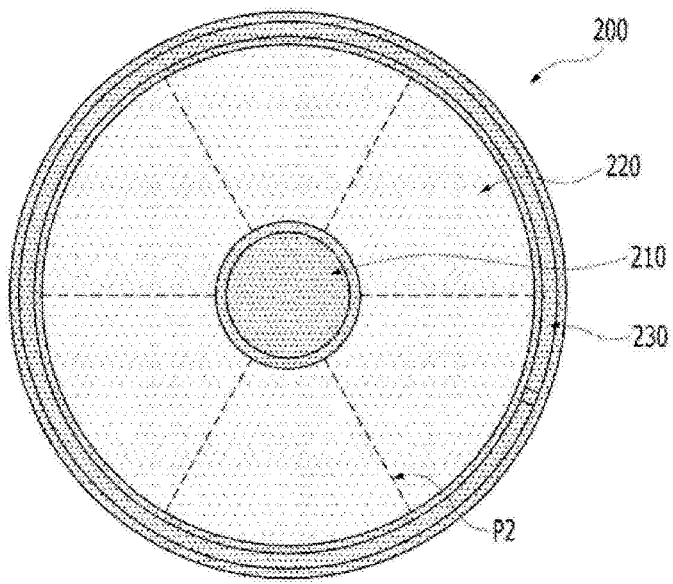
FIG. 7 is a view showing an upper surface of the cover member of FIG. 6.

FIG. 6 is a perspective view of a cover member in the lighting device according to the embodiment. FIG. 7 is a view showing an upper surface of the cover member of FIG. 6.

The cover member 200 may include a light diffusion area 220, an inner area 210 disposed inside the light diffusion area 220 and an outer area 230 disposed outside the light diffusion area 220.

The inner area 210 and the light diffusion area 220 may be provided above the light sources 11 to 16 and the light guide 100. The outer area 230 may be provided at a side surface of the light guide 100.

The inner area 210 and the outer area 230 may be light shields. The inner area 210 and the outer area 230 may be made of a material capable of shielding light or may have characteristics capable of shielding light. The light diffusion area 220 may be made of a light-transmissive material capable of diffusing light. The light diffusion area 220 may be provided with light-transmissive patterns P2.

In FIG. 7, the light-transmissive patterns P2 may correspond to the plural light sources 11 to 16 in FIG. 1, respectively. The light-transmissive patterns P2 may be disposed over the light sources 11 to 16, respectively.

The inner area 210 may be provided to face an upper surface of the first area 110 of the light guide 100. The light diffusion area 220 may be provided to face an upper surface of the second area 120 of the light guide 100.

Figure 8:
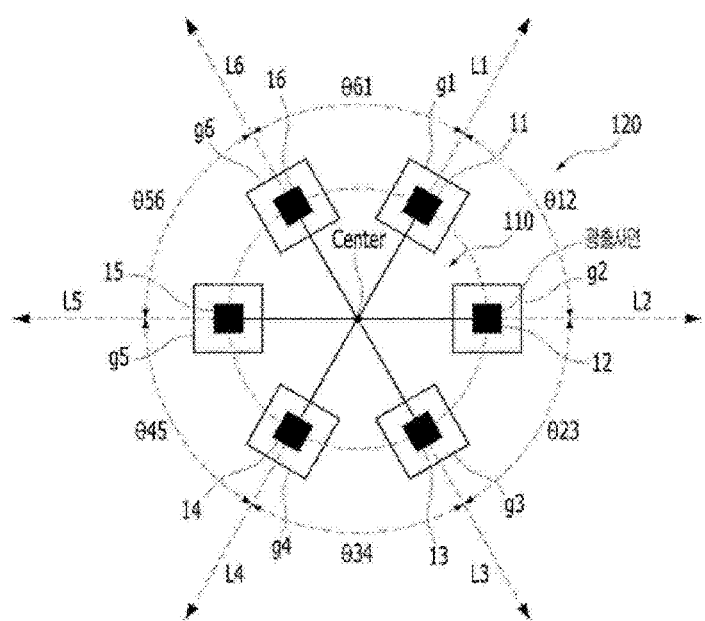
FIG. 8 is a view showing optical axes of light emitted from respective light emitting elements.

FIG. 8 is a view showing optical axes of light emitted from respective light emitting elements.

In FIG. 8, each light exit surface of the plural light sources 11 to 16 may be provided to be directed in a direction opposite to the center of the concentric circle. That is, the plural light sources 11 to 16 may emit light in a direction from the center of the concentric circle toward an edge of the light guide 100.

Optical axes of light beams L1 to L6 emitted from the plural light sources 11 to 16 may be disposed to extend from the center of the concentric circle. That is, in FIG. 5, the center of the concentric circle may coincide with the center of the light guide 100. In detail, paths of the light beams L1 to L6 emitted from the light sources 11 to 16 are indicated by dotted lines. When the paths of the light beams L1 to L6 are indicated by solid lines under the condition that the paths indicated by the dotted lines further extend through the light sources 11 to 16, the solid lines may meet the center of the concentric circle.

In addition, in FIG. 8, angles 812 to 861 formed by the optical axes of the light beams L1 to L6 emitted from the light sources 11 to 16 disposed adjacent to one another may be equal.

That is, the angle 812 formed by the optical axis L1 of light emitted from the first light source 11 and the optical axis L2 of light emitted from the second light source 11, the angle 823 formed by the optical axis L2 of light emitted from the second light source 11 and the optical axis L3 of light emitted from the third light source 13, the angle 834 formed by the optical axis L3 of light emitted from the third light source 13 and the optical axis L4 of light emitted from the fourth light source 14, the angle 845 formed by the optical axis L4 of light emitted from the fourth light source 14 and the optical axis L5 of light emitted from the fifth light source 15, the angle 856 formed by the optical axis L5 of light emitted from the fifth light source 15 and the optical axis L6 of light emitted from the sixth light source 16, and the angle 861 formed by the optical axis L6 of light emitted from the sixth light source 16 and the optical axis L1 of light emitted from the first light source 11 may be equal. In FIG. 5, the angles 812 to 861 may be 50° because there are 6 light sources 11 to 16.

Figure 9:
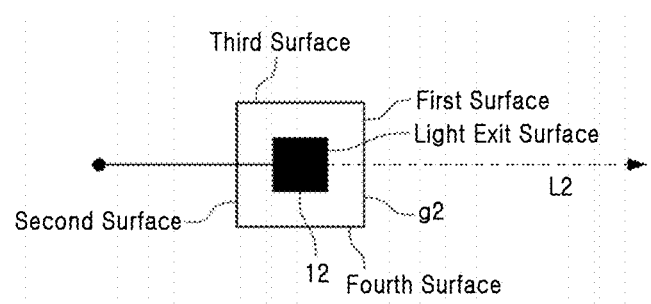
FIG. 9 is a view concretely showing the second light source in the second groove in FIG. 1.

FIG. 9 is a view concretely showing the second light source in the second groove in FIG. 1.

The second light source 12 provided in the second groove g2 is shown. Shapes of the grooves g1 to g6 may be identical while being point-symmetric.

FIG. 9 shows a horizontal cross-section of the second groove g2. The horizontal cross-section of the second groove g2 may have at least four sides. Actually, the groove g2 has a three-dimensional shape and, as such, the four sides may be referred to as "first to fourth surfaces".

When the first to fourth surfaces surround the second groove g2 in a horizontal direction, the first surface is provided in a light exit surface direction of the second light source 12, the second surface faces the first surface, and the third and fourth surfaces may be disposed between the first surface and the second surface while facing each other.

Figure 10:
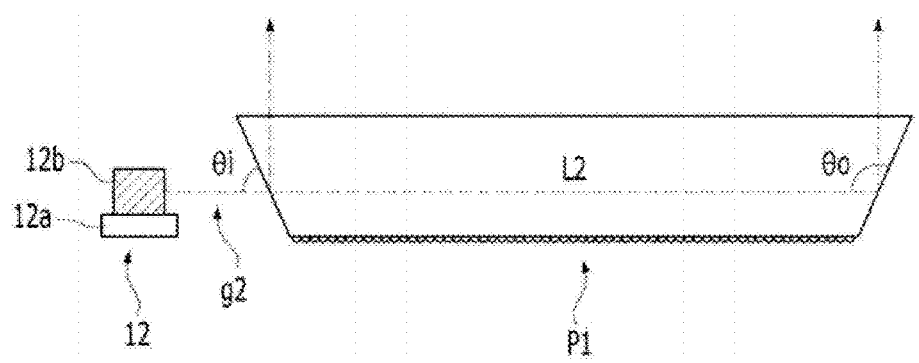
FIG. 10 is a view showing a path along which light emitted from the second light source in FIG. 1 passes though the light guide.

FIG. 10 is a view showing a path along which light emitted from the second light source in FIG. 1 passes though the light guide.

The second light source 12 may include the second light emitting element 12b on the second circuit board 12a. The light L2 emitted from the second light emitting element 12b may advance to the light guide. In this case, a portion of the light L2 may be reflected from a light incidence surface, through which light is incident upon the light guide. Light incident upon the light guide may be reflected from a light exit surface. Here, the light incidence surface may be an inclined area of the light guide shown at a left side of FIG. 7, and the light exit surface may be an inclined area of the light guide shown at a right side of FIG. 7. In addition, the light incidence surface may be the first surface (inner surface) in FIG. 2, and the light exit surface may be the second surface (outer surface) in FIG. 2.

In FIG. 10, an angle $\theta i$ of the first surface, which is the light incidence surface of the light guide, inclined with respect to the optical axis of the light L2 emitted from the second light source 12 and an angle $\theta o$ of the second surface, which is the light exit surface of the light guide, inclined with respect to the optical axis of the light L2 emitted from the second light source 12 may be equal. Light may be reflected from the light incidence surface and light exit surface of the light guide in an upward direction.

For example, the angle $\theta i$ of the first surface, which is the light incidence surface of the light guide, inclined with respect to the optical axis of the light L2 emitted from the second light source 12 may be 40 to 50°, and the angle $\theta o$ of the second surface, which is the light exit surface of the light guide, inclined with respect to the optical axis of the light L2 emitted from the second light source 12 may be 130 to 140°. Here, although inclinations of the light incidence surface and light exit surfaces with respect to the optical axis of the light L2 are equal, the angles $\theta i$ and $\theta o$ may be indicated to have a difference of 90°.

When the angles $\theta i$ and $\theta o$ are outside the above-described ranges, light reflected from the light incidence surface and light exit surface of the light guide may not be directed toward an upper surface in FIG. 7, and may be directed in other directions. As a result, light efficiency of the lighting device may be degraded.

In addition, the first pattern P1 may be formed at the lower surface of the light guide. For example, the first pattern P1 may be provided to have a dot matrix shape or may be provided to have a linear groove shape. The first pattern P1 may uniformly diffuse light incident upon the light guide throughout the light guide.

Figure 11:
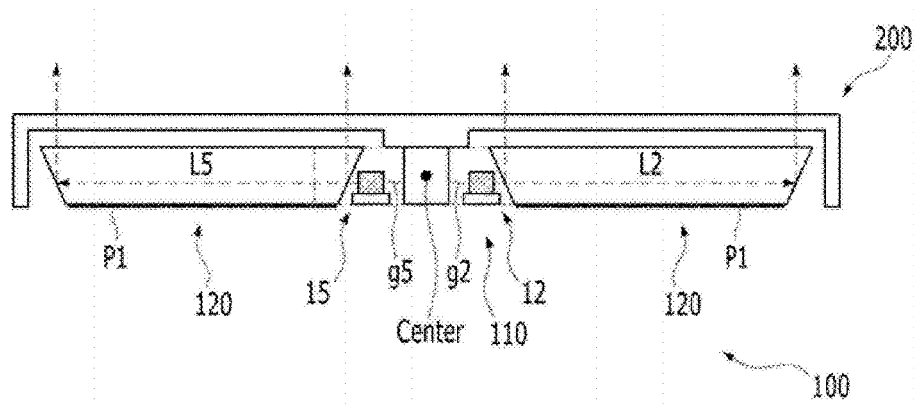
FIG. 11 is a view showing the light sources, the light guide and the cover member in the lighting device according to the embodiment.

FIG. 11 is a view showing the light sources, the light guide and the cover member in the lighting device according to the embodiment.

In the lighting device, the light sources 12 and 15, and the light guide 100 are disposed within the cover member 200 in an inserted manner.

Each of the light beams L2 and L5 emitted from the light sources 12 and 15 may be reflected from the light incidence surface and light exit surface of the light guide 100. The reflected light beams may advance toward the cover member 200.

In addition, as described with reference to FIGS. 6 and 7, the inner area 210 of the cover member 200 may be provided over the first area 110 of the light guide 100, and the light diffusion area 220 of the cover member 200 may be provided over the second area 120 of the light guide 100.

Accordingly, light advancing in an upward direction in the second area 120 of the light guide 100 may pass through the light diffusion area 220 of the cover member 200. In addition, light does not advance toward the side surface of the cover member 200 because the outer area 230 of the cover member 200 is a light shield.

In FIG. 11, the thickness of the inner area of the cover member 200 may be greater than the thickness of the light diffusion area. Due to such a thickness difference, the upper surface of the first area 110 of the light guide 100 may contact the lower surface of the inner area of the cover member 200, and the upper surface of the second area 120 of the light guide 100 may be spaced apart from the lower surface of the light diffusion area of the cover member 200.

In addition, an air guide may be formed in an area spaced apart from the upper surface of the second area 120 of the light guide 100 and the lower surface of the light diffusion area of the cover member 200. Light exiting the light guide 100 may advance in the air guide area while being diffused toward the cover member 200.

Figure 12:
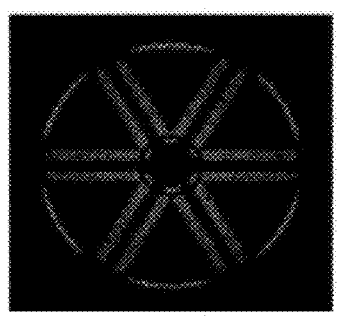
FIG. 12 is a view showing an image of light emitted from the lighting device according to the embodiment.

FIG. 12 is a view showing an image of light emitted from the lighting device according to the embodiment.

An area in which a great amount of light is emitted from the lighting device is displayed by red. Straight lines in 6 directions passing through a center are displayed over optical axis directions of respective light beams by the light-transmissive pattern P2 of the cover member as described above. In addition, the straight lines are displayed in pairs. In accordance with the shape of the light-transmissive pattern P2, such an image may be realized.

In addition, red circles are displayed in central and edge areas of the image. The circles may be displayed as light beams advance toward the cover member after being reflected from the light incidence surface and light exit surface of the light guide, as described above.

In the lighting device according to the embodiment, light concentration effects may be enhanced in accordance with the configuration in which the light incidence surface and light exit surface of the light guide are inclined. Accordingly, the amount of light advancing toward the front surface increases, as compared to conventional lighting devices. In addition, light having a circular shape is displayed at each of inner and outer areas and, as such, a new image may be realized.

Figure 13:
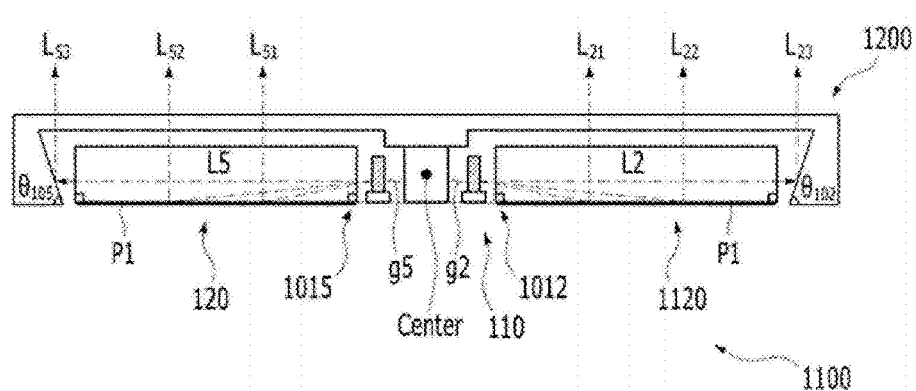
FIG. 13 is a view showing light sources, a light guide and a cover member in a lighting device according to another embodiment.

FIG. 13 is a view showing light sources, a light guide and a cover member in a lighting device according to another embodiment.

The lighting device according to this embodiment is similar to the embodiment shown in FIGS. 1 to 12, but has a difference therefrom in that the first and second surfaces of the light guide are provided to be perpendicular to an optical axis, and an inner surface of the cover member facing the light guide is inclined with respect to the optical axis.

In detail, in the lighting device, light sources 1012 and 1015 and a light guide 1100 are disposed within a cover member 1200 in an inserted manner. Light beams L2 and L5 emitted from the light sources 1012 and 10915 are reflected from a light incidence surface of the light guide 1100 and a light exit surface of the light guide 1100, respectively. The reflected light beams may advance toward the cover member 1200.

In addition, a first surface of the light guide 1100 facing the second light source 10912 and the fifth light source 1015 and a second surface of the light guide 1100 directed in a direction opposite to the first surface may be disposed to be perpendicular to optical axes of the light beams L2 and L5. Furthermore, an inner surface of the cover member 1200 may be disposed to form predetermined angles $\theta_{102}$ and $\theta_{105}$ with respect to the optical axes of the light beams L2 and L5, respectively. By virtue of the angles $\theta_{102}$ and $\theta_{105}$, light beams advancing toward the cover member 1200 after passing through the light guide 100 may be reflected from the inner surface of the cover member 1200 and, as such, may advance in an upward direction in FIG. 13. The angles $\theta_{102}$ and $\theta_{105}$ may be 45 to 50°.

Figure 14A:
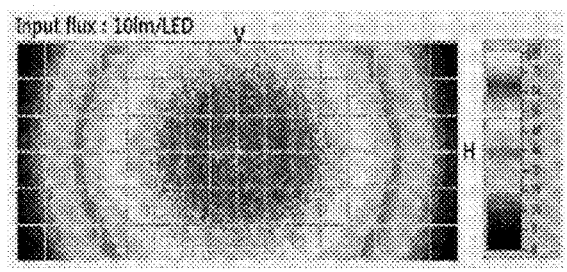
FIGS. 14A and 14B are views showing power distribution of light emitted in FIG. 13.
Figure 14B:
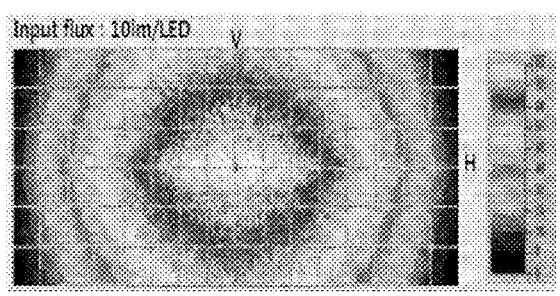

FIGS. 14A and 14B are views showing power distribution of light emitted in FIG. 13.

FIG. 14A shows power distribution of light emitted from a conventional lighting device. Illumination in a horizontal direction H is about 87% of a reference value and, as such, is too dark, and illumination in a vertical direction V is 177% of the reference value.

FIG. 14B shows power distribution of light emitted from the lighting device according to the embodiment of FIG. 13. Illumination in a horizontal direction H is about 105% of the reference value, and illumination in a vertical direction V is 172% of the reference value.

Thus, when the inner surface of the cover member in the lighting device is inclined, as in the embodiment, light passing through the light guide is reflected from the inner surface of the cover member and, as such, illumination at the edge area of the lighting device may increase.

Although the foregoing description has been given mainly in conjunction with embodiments, these embodiments are only illustrative without limiting the invention. Those skilled in the art to which the present invention pertains can appreciate that various modifications and applications illustrated in the foregoing description may be possible without changing essential characteristics of the embodiments. For example, constituent elements concretely illustrated in the embodiments may be implemented through modification thereof. In addition, differences associated with such modifications and applications should be interpreted as falling within the scope of the invention defined in the accompanying claims.

INDUSTRIAL APPLICABILITY

The lighting device according to each embodiment may be used in indoor lighting, a street lamp, or the like.

The invention claimed is:
1. A lighting device comprising:
a plurality of light sources disposed at a circumference of a concentric circle;

a light guide disposed adjacent to the light sources while surrounding the light sources; and a cover member configured to surround upper surfaces of the light sources and upper and side surfaces of the light guide, wherein the light guide is configured such that a first surface thereof in a direction of the light sources and a second surface thereof in a direction opposite to the light sources have inclinations with respect to an optical axis of light emitted from the light sources, respectively, and the cover member has a light-transmissive pattern in a light diffusion area thereof facing the upper surface of the light guide, the light guide is provided with a plurality of grooves at a central first area thereof such that the plural light sources are inserted into the grooves, respectively, and wherein shapes of the plurality of grooves are identical in point symmetry with respect to a center of the concentric circle.

2. The lighting device according to claim 1, wherein light exit surfaces of the plural light sources are disposed in a direction opposite to the center of the concentric circle.

3. The lighting device according to claim 1, wherein:

optical axes of light beams respectively emitted from the plural light sources are arranged to extend from a center of the concentric circle; and angles formed by the optical axes of the light beams emitted from adjacent ones of the light sources are equal.

4. The lighting device according to claim 1, wherein:

each of the grooves has a horizontal cross-section having at least four sides; and each of the grooves comprises a first surface in a light exit surface direction of the corresponding light source, a second surface facing the first surface, and third and fourth surfaces between the first surface and the second surface.

5. The lighting device according to claim 4, wherein an inclination of a light incidence surface of the light guide with respect to the optical axis of light emitted from the light sources is equal to an inclination of a light exit surface of the light guide with respect to the optical axis of light emitted from the light sources.

6. The lighting device according to claim 1, wherein:

a first angle, at which a light incidence surface of the light guide is inclined with respect to the optical axis of light emitted from the light sources, is 40 to 50'; and a second angle, at which a light exit surface of the light guide is inclined with respect to the optical axis of light emitted from the light sources, is 130 to 140°.

7. The lighting device according to claim 4, wherein the light-transmissive pattern of the cover member is disposed over optical axes of light beams emitted from the plural light sources.

8. The lighting device according to claim 4, wherein the cover member further comprises light shields respectively disposed in an inner area inside the light-transmissive pattern and an outer area outside the light-transmissive pattern, and the inner area has a greater thickness than the light diffusion area.

9. The lighting device according to claim 4, wherein the light guide is provided with a first pattern at a lower surface thereof.

10. The lighting device according to claim 4, wherein the light guide and the cover member are spaced apart from each other, and an air guide is formed in a space area between the light guide and the cover member.

11. A lighting device comprising:

a plurality of light sources disposed at a circumference of a concentric circle;

a light guide disposed adjacent to the light sources while surrounding the light sources; and a cover member configured to surround upper surfaces of the light sources and upper and side surfaces of the light guide, wherein the cover member has an inner side facing the light guide inclined with respect to optical axes of the light emitted from the plurality of light sources.

12. The lighting device according to claim 11, wherein the light guide is configured such that a first surface thereof in a direction of the light sources and a second surface thereof in a direction opposite to the light sources are perpendicular to an optical axis of light emitted from the light sources, respectively.

13. The lighting device according to claim 11, wherein the cover member has a light-transmissive pattern in a light diffusion area thereof facing the upper surface of the light guide.

14. The lighting device according to claim 11, wherein light exit surfaces of the plural light sources are disposed in a direction opposite to the center of the concentric circle.

15. The lighting device according to claim 11, wherein optical axes of light beams respectively emitted from the plural light sources are arranged to extend from a center of the concentric circle.

16. The lighting device according to claim 11, wherein angles formed by the optical axes of the light beams emitted from adjacent ones of the light sources are equal.

17. A lighting device comprising:

a plurality of light sources disposed at a circumference of a concentric circle;

a light guide disposed adjacent to the light sources while surrounding the light sources; and a cover member configured to surround upper surfaces of the light sources and upper and side surfaces of the light guide, wherein the light guide is configured such that a first surface thereof in a direction of the light sources and a second surface thereof in a direction opposite to the light sources have inclinations with respect to an optical axis of light emitted from the light sources, respectively, and the cover member has a light-transmissive pattern in a light diffusion area thereof facing the upper surface of the light guide, the light guide is provided with a plurality of grooves at a central first area thereof such that the plural light sources are inserted into the grooves, respectively, wherein shapes of the plurality of grooves are identical in point symmetry with respect to a center of the concentric circle, wherein light exit surfaces of the plural light sources are disposed in a direction opposite to the center of the concentric circle, and wherein optical axes of light beams respectively emitted from the plural light sources are arranged to extend from a center of the concentric circle.

18. The lighting device according to claim 17, wherein wherein angles formed by the optical axes of the light beams emitted from adjacent ones of the light sources are equal.

19. The lighting device according to claim 17, wherein each of the grooves has a horizontal cross-section having at least four sides.

20. The lighting device according to claim 19, wherein each of the grooves comprises a first surface in a light exit surface direction of the corresponding light source, a second surface facing the first surface, and third and fourth surfaces between the first surface and the second surface.

* * * * *